H. BRADFORD.
Apparatus for Separating Ores and other Substances.
No. 143,492. Patented Oct. 7, 1873.

UNITED STATES PATENT OFFICE.

HEZEKIAH BRADFORD, OF READING, PENNSYLVANIA.

IMPROVEMENT IN APPARATUS FOR SEPARATING ORES AND OTHER SUBSTANCES.

Specification forming part of Letters Patent No. 143,492, dated October 7, 1873; application filed September 23, 1873.

*To all whom it may concern:*

Be it known that I, HEZEKIAH BRADFORD, of Reading, in the State of Pennsylvania, have invented an Improvement in Separating Substances of Different Specific Gravities, of which the following is a specification:

Separators have heretofore been made in which the material to be operated upon has been supplied into a box with a perforated bottom, and a current of water has been forced up and down through the same by a separate piston or plunger, and the material has been delivered at two or more places, according to gravity. In these devices there is a great loss of power and time in overcoming the inertia of the large body of water, and the strokes have to be comparatively long and slow in order to move the inert materials, and the water, in being drawn or sucked down through the loose material, causes such material to descend with rapidity, so that its gradual fall by gravity in the water is interfered with and a perfect separation of different gravities prevented.

In my present invention the jig itself and its contents are reciprocated, as in Letters Patent No. 20,756, granted to me June 29, 1858, and extended; but instead of employing valves upon the perforated jig-bottom and delivering the heavier portions through the bottom and the lighter portions over the edge of the jig, as therein described, I make use of two or more delivery-edges at different elevations, so that the materials are separated according to gravity as they fall through the upward-flowing current while the jig-bottom descends, and the delivery takes place at two or more places continuously, the lighter material passing over the top of the jig-box and the heavier off the edge of the perforated bottom of the jig.

Figure 1:
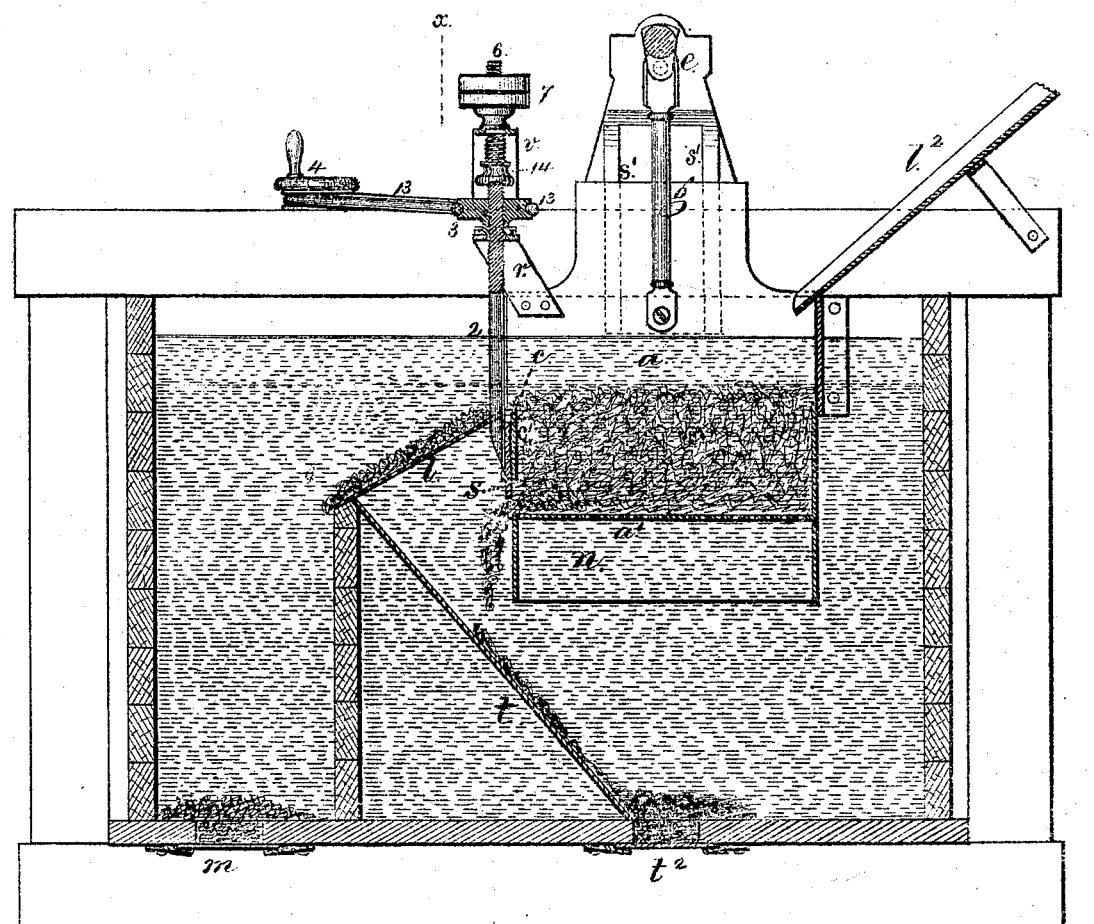
Figure 2:
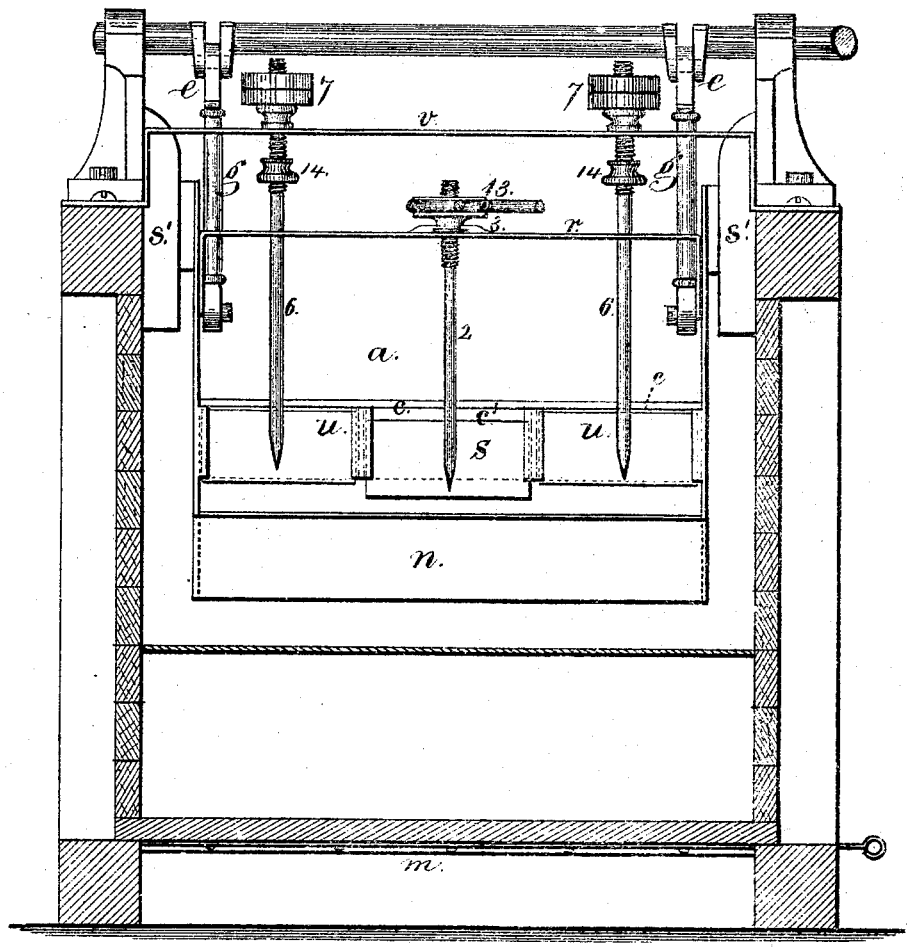
Figure 3:
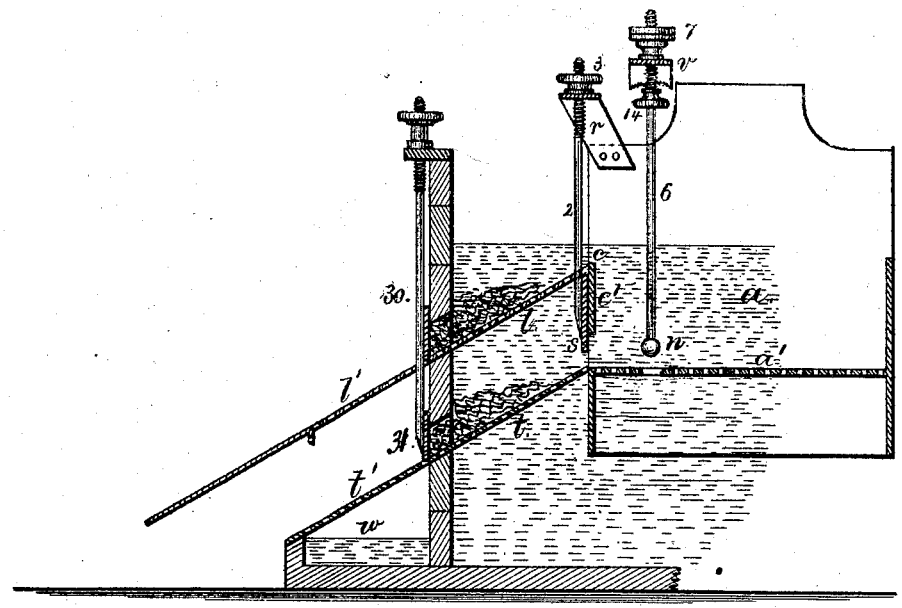

In the drawing, Figure 1 is a vertical section of the apparatus transversely of the jig, and Fig. 2 is a cross-section at the line $x\,x$. Fig. 3 is a section of a modification of the apparatus.

The jig-box $a$ is provided with slides fitted to move in vertical guides $s'$, and reciprocated by the cranks $e$ and connecting-rods $g$, and counterbalance-springs may be provided, substantially as described in my specification dated January 31, 1873; and the coal or other material is supplied by the trough or chute $l^2$. The bottom $a'$ of the jig is perforated with numerous holes sufficiently small to retain the materials that are to be separated, but allow the water to pass freely.

The coal or other material of light gravity is delivered over the edge $c$ by the reciprocation of the jig and the flow of water, as set forth in aforesaid specification; and the portions $n$ of the jig or of a surrounding stationary box extending below the bottom $a'$ serve to retain the water, as set forth in my aforesaid specification, so that the vibrations of the jig shall produce a pumping action upon the water, because, as the jig descends against the inertia of the water, the materials become loose and fall, with more or less rapidity, through the upward current of water, according to gravity; and as the jig rises the compact mass of material acts as a piston to lift the water and continue the upward current.

The overflow water aids in carrying the lighter materials over the edge $c$ upon the grate or chute $l$; and said materials may be discharged by elevator-buckets, or a rake, as shown in said specification, or by opening a door or trap periodically. I have shown such trap at $m$.

The slate, bone-coal, or heavier materials are delivered laterally through a mouth formed between the edge of the grate or perforated jig-bottom $a'$ and the lower edge of the side $c'$ of the jig, and the partition $l$ keeps the materials of different gravities separate. The width or height of this mouth, when open, should be large enough to allow the substances to pass freely without being clogged or blocked; and the amount of opening may be varied by an adjustable gate or slide $s$. There may be one or more of these gates, occupying the entire length, or only a part of the length, of the mouth. I have shown this gate $s$ as only part of the length of the mouth; and the same is placed in slides upon the side $c'$ of the jig, and it is adjustable vertically by the rod 2 and nut 3, supported by the frame $r$, that is attached to, and moves with, the jig; and in order to adjust this gate $s$ while the jig is in motion, I employ a belt, 13, to the hand-wheel 4, so that the nut 3 may be revolved either way without stopping the jig.

Where several gates are used, they should all be movable or adjustable.

It will be apparent that, when this apparatus is employed for separating coal from slate and other materials of greater specific gravity than the coal, the heavier materials will pass out laterally through the mouth, and the coal over the edge $c$. If the slate accumulates so that it delivers with the coal, one or more of the gates $s$ should be raised; and if the coal passes away with the slate, the gate should be lowered.

In order to prevent too rapid discharge of the heavier parts, and at the same time leave a space large enough to discharge the largest pieces that rest upon the perforated bottom $a'$, I make use of the cut-offs $u$ that are suspended, by the rods 6, from the stationary frame $r$. These rods 6 should be made with screw-threads and nuts 7, so as to adjust their positions, and prevent the cut-offs descending as the jig moves downwardly. As the jig rises these cut-offs close the mouths more or less, and prevent the material passing out too rapidly. The weight of these gates, or a spring to each, insures their operation.

In case of any large piece of material remaining under the cut-off the latter will rise with the jig as it ascends, so as not to injure the cut-off. The nut 14, however, determines the amount that the cut-off can be raised. The cut-off prevents the material delivering through the mouth or opening, except when the jig is near the bottom of its movement, at which time the materials are in a condition favorable for the heavier portion to pass through the opening.

Fig. 3 shows this cut-off $n$ in the form of a valve to an opening in the bottom of the jig. There may be several of such openings and cut-offs, or one or more may be applied at the side of the jig-box, as in Figs. 1 and 2. Where the openings are made through the jig-bottom and the cut-offs applied to the same, as in Fig. 3, they may be located in such places as to free the jig of the heavier materials, and prevent the lateral discharge being overcrowded. These cut-offs may be kept down with a weight or spring, and will be inoperative except when the nuts are in such a position as to sustain the cut-offs at any desired point in the downward movement of the jig. The set-nuts or stops 14, that regulate the upward movement of the cut-offs, also prevent the cut-offs becoming wedged open too wide.

It is generally best to supply the material at one side of the jig and deliver it at the other side, as shown in my patent No. 20,756; but the jig may be made to deliver at one or more sides or edges. In all cases the supply should be so positioned in relation to the place or places of delivery that the material has to travel a nearly uniform distance, and the perforated jig-bottom should be inclined, if necessary, toward the point of delivery, as shown in my patent of June 29, 1858, just enough to keep the layer of material of about the same thickness from the point of supply to that of delivery, or so that the average specific gravity of the entire layer of material over that of the water shall be uniform, and thereby insure uniformity of resistance to the upward flow of water through the mass, and consequently greater accuracy in the separation of the materials, according to gravity, as those materials fall through the water.

In separating ores, bituminous coal, or many other substances from their impurities, the materials separated should be kept entirely apart; but when the larger sizes of anthracite coal are operated upon the finer particles of coal, that are valueless, may pass away with the slate. To accomplish this the circulation may be maintained by the water passing from the separated anthracite coal through the perforated partition $l$, Fig. 1, or $l$ and $t$, Fig. 3, and returning under the jig; but with ore or bituminous coal the incline $l$ should not be perforated, and the water should pass into the front part of the tank with the lighter materials, and allowed to settle, and the water should return at the ends of the jig near the top of the water into the portion of the tank in which the jig is reciprocated, the tank being enlarged to give the necessary space.

The gate or gates $s$ may be opened periodically by hand or by an automatic device, such as a ratchet and pawl operated by the reciprocation of the jig, so that the slate or heavier materials may be discharged from the jig, and the materials may pass down the receptacle incline $t$, Fig. 1, under the jig, to be discharged periodically by the gate or slide $t^2$; or, by making the tank deeper and continuing the incline $t^1$, the materials may be delivered to an elevator of any suitable character; or the material may be delivered through gates at the side of the tank, as seen in Fig. 3, so as to avoid the use of elevators, the coal being allowed to discharge from the incline $l$ by opening a gate, 30, periodically by hand or automatically, the slate or heavier materials being delivered in the same way by a gate, 31. In either case the coal can be freed from the water; or the water run from the slate, by allowing them to pass down separate perforated inclines $l^1 t^1$ outside the tank of the jig, and the water thus passing away from said tank can be received into a vessel, $w$, and returned to the tank in any suitable manner; or the water may be otherwise supplied to maintain the proper level in the tank. In all instances the circulation of the water through the jig while in operation must not be interfered with.

If the rods 6 of the cut-offs are made so that the nuts 14 can be screwed down upon the frame $r$, then the cut-offs can be changed to gates; or, by carrying the rod 2 of the gate $s$ up and providing the nuts 7 and 14, the gate $s$ can be changed to a cut-off.

It is preferable to screen or assort the material as to size, and only operate upon one size at a time; but that is not always necessary.

The general statements made in my aforesaid specification of January 31, 1873, in relation to the height of water above the jig, the rapidity of vibration, and extent of stroke relatively to the size and gravity of the material operated upon will indicate the general points to be borne in mind in operating this apparatus to the best advantage.

I claim as my invention—

1. A jig-box with a perforated bottom, that is reciprocated in water and provided with two places for delivery, one at a higher level than the other, for passing away the materials of different specific gravities, substantially as set forth.

2. An adjustable gate or gates applied to enlarge or contract the lower delivery-opening in a jig that is provided with a perforated bottom and is reciprocated in water, substantially as set forth.

3. A cut-off applied to the lower delivery-opening of a jig-box that is reciprocated in water, substantially as set forth.

Signed by me this 18th day of September, A. D. 1873.

HEZEKIAH BRADFORD.

Witnesses:
GEO. T. PINCKNEY,
CHAS. H. SMITH.